United States Patent
Saini et al.

(10) Patent No.: US 12,552,981 B2
(45) Date of Patent: *Feb. 17, 2026

(54) FILTER CAKE REMOVAL TREATMENT FLUID WITH CHELATING AGENT AND VISCOELASTIC SURFACTANT

(71) Applicant: Saudi Arabian Oil Company, Dhahran (SA)

(72) Inventors: Rajesh Kumar Saini, Cypress, TX (US); Katherine Leigh Hull, Houston, TX (US); Amy J. Cairns, Houston, TX (US); Brady Kevin Crane, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,267

(22) Filed: Jun. 5, 2024

(65) Prior Publication Data

US 2025/0376614 A1 Dec. 11, 2025

(51) Int. Cl.
*C09K 8/528* (2006.01)
*C09K 8/34* (2006.01)
*C09K 8/536* (2006.01)
*E21B 37/06* (2006.01)

(52) U.S. Cl.
CPC ............... *C09K 8/528* (2013.01); *C09K 8/34* (2013.01); *C09K 8/536* (2013.01); *E21B 37/06* (2013.01); *C09K 2208/30* (2013.01)

(58) Field of Classification Search
None
See application file for complete search history.

(56) References Cited

U.S. PATENT DOCUMENTS

| | | | |
|---|---|---|---|
| 7,219,731 B2 | 5/2007 | Sullivan et al. | |
| 7,500,517 B2 | 3/2009 | Looney et al. | |
| 7,588,085 B2 | 9/2009 | Acock et al. | |
| 7,789,164 B2 | 9/2010 | Looney et al. | |
| 7,857,055 B2 | 12/2010 | Li | |
| 9,688,904 B2 | 6/2017 | Wang et al. | |
| 11,124,695 B2 | 9/2021 | Mahmoud et al. | |
| 11,352,548 B2 | 6/2022 | Hull et al. | |
| 11,597,867 B2 | 3/2023 | Hull et al. | |
| 2003/0216263 A1 | 11/2003 | Tibbles et al. | |
| 2007/0087940 A1 | 4/2007 | Qu et al. | |
| 2008/0039347 A1* | 2/2008 | Welton ................. | C09K 8/08 507/213 |
| 2009/0139723 A1* | 6/2009 | Pirolli ................... | C09K 8/52 507/203 |

(Continued)

FOREIGN PATENT DOCUMENTS

WO WO 0040667 7/2000
WO WO 2018187565 10/2018

OTHER PUBLICATIONS

U.S. Appl. No. 18/732,298, filed Jun. 3, 2024, Hull et al.

(Continued)

*Primary Examiner* — Andrew Sue-Ako
(74) *Attorney, Agent, or Firm* — Fish & Richardson P.C.

(57) ABSTRACT

A reactive treatment fluid for filter cake removal, the reactive treatment fluid including: a base fluid; a chelating agent; a carbonate; an oxidizing salt; an organic acid; a viscoelastic surfactant (VES); and a base.

18 Claims, 11 Drawing Sheets

(56) References Cited

U.S. PATENT DOCUMENTS

| | | |
|---|---|---|
| 2010/0216672 A1 | 8/2010 | Todd |
| 2012/0247774 A1 | 10/2012 | Li et al. |
| 2013/0137610 A1 | 5/2013 | Huang et al. |
| 2014/0116710 A1 | 5/2014 | Naser-El-Din et al. |
| 2017/0066959 A1 | 3/2017 | Hull et al. |
| 2021/0024809 A1* | 1/2021 | Ba Geri ............... C09K 8/032 |
| 2021/0198553 A1* | 7/2021 | Hull ..................... C09K 8/536 |

OTHER PUBLICATIONS

U.S. Appl. No. 18/735,965, filed Jun. 6, 2024, Hull et al.

Abdelgawad et al., "Stimulation of high temperature carbonate gas reservoirs using seawater and chelating agents: Reaction kinetics," Journal of Natural Gas Science and Engineering, Jul. 2018, 55:595-605, 11 pages.

Almubarak et al., "From initial treatment design to final disposal of chelating agents: a review of corrosion and degradation mechanisms," RSC Adv., Jan. 12, 2022, 12:1813-1833, 21 pages.

amcmud.com [online], "AMC Salt Tables," Available on or before Aug. 2019, retrieved on Aug. 2, 2024, retrieved from URL <https://amcmud.com/wp-content/uploads/sites/2/2019/10/AMC-Salt-Tables-August2019.pdf>, 17 pages.

Bageri et al., "Different techniques for characterizing the filter cake," Presented at the SPE Unconventional Gas Conference and Exhibition, Muscat, Oman, Jan. 2013, 13 pages.

Bageri et al., "Effect of Sand Content on the Filter Cake Properties and Removal During Drilling Maximum Reservoir Contact Wells in Sandstone Reservoir," J. Energy Resour. Technol., May 2016, 138(3):032901-1-032901-10, 10 pages.

Bezemer et al., "Filtration Behavior of Circulating Drilling Fluids," Society of Petroleum Engineers Journal, Dec. 1966, pp. 292-298, 7 pages.

Civan, "A Multi-Phase Mud Filtrate Invasion and Wellbore Filter Cake Formation Model," Presented at the International Petroleum Conference and Exhibition of Mexico, Veracruz, Mexico, Oct. 1994, pp. 399-412, 14 pages.

CRO242ES, "CRONOX™ 242 ES Corrosion Inhibitor," Safety Data Sheet Brochure, Dec. 17, 2019, 12 pages.

Davidson et al., "New and Effective Filter Cake Removal Optimizes Water Injectivity," Presented at the SPE International Symposium and Exhibition on Formation Damage Control, Lafayette, Louisiana, USA, Feb. 2012, 11 pages.

Davison et al., "Oil-Based Muds for Reservoir Drilling: Their Performance and Cleanup Characteristics," SPE Drilling & Completion, Jun. 2001, 16(2):127-134, 8 pages.

drillingfluid.org [online], "Completion and Workover Fluids," Aug. 30, 2018, retrieved on Aug. 2, 2024, retrieved from URL <https://drillingfluid.org/drilling-fluids-handbook/completion-and-workover-fluids.html>, 4 pages.

Frick et al., "Horizontal Well Damage Characterization and Removal," SPE Prod & Frac, Feb. 1, 1993, 8(1):15-22, 8 pages.

Gordon et al., "Rheological Properties of Cement Spacer: Mixture Effect," Prepared for presentation at the 2008 AADE Fluids Conference and Exhibition held at the Wyndham Greenspoint Hotel, Houston, Texas, Apr. 8-9, 2008, 5 pages.

Hanssen et al., "New Enzyme Process for Downhole Cleanup of Reservoir Drilling Fluid Filtercake," Presented at the SPE International Symposium on Oilfield Chemistry, Houston, Texas, Feb. 16, 1999, 13 pages.

Hossain et al., "Chapter 3—Drilling Fluids," Fundamentals of Sustainable Drilling Engineering, 2015, pp. 73-139, 67 pages.

Huang et al., "Degradation of high molecular weight polyacrylamide by alkali-activated persulfate: Reactivity and potential application in filter cake removal before cementing," Journal of Petroleum Science and Engineering, Mar. 2019, 174:70-79, 10 pages.

Jaberi et al., "Minimizing the Barite Scale in Carbonate Formations during the Filter Cake Removal Process," ACS Omega, May 19, 2022, 7(21): 17976-17983, 8 pages.

Jaffal et al., "Modeling of filtration and mudcake buildup: An experimental investigation," Journal of Natural Gas Science and Engineering, 2017, 38:1-11, 11 pages.

O-BASF, "Global Oilfield Solutions Corrosion Inhibitors for Production: Basocorr™," BASF—Global Oilfield Solutions brochure, available on or before Sep. 6, 2017, 6 pages.

Rabia, "Chapter 7—Drilling Fluids," Well Engineering & Construction, 2001, pp. 197-234, 38 pages.

Rana et al., "Application of High-Density Brines in Drilling and Completion Fluids: Current Insights and Future Perspectives," Energy & Fuels, 2024, 38:6561-6578, 18 pages.

Shende, "Dissolution of Barite Scale Using Chelating Agents," A Thesis for the degree of Master of Science, Texas A&M University, May 2012, 68 pages.

Siddig et al., "A review of different approaches for water-based drilling fluid filter cake removal," Journal of Petroleum Science and Engineering, Sep. 2020, 19(107346):1-10, 10 pages.

Siddig et al., "A review of the various treatments of oil-based drilling fluids filter cakes," Journal of Petroleum Exploration and Production Technology, published online on Dec. 22, 2021, 12:365-381, 17 pages.

Sosa et al., "Acidic Polysaccharides as Green Alternatives for Barite Scale Dissolution," ACS Applied Materials & Interfaces, Nov. 24, 2020, 12(49):55434-55443, 10 pages.

Thiele et al., "Rapid Dissolution of $BaSO_4$ by Macropa, an 18-Membered Macrocycle with High Affinity for $Ba^{2+}$," Journal of the American Chemical Society, Nov. 28, 2018, 140(49):17071-17078, 8 pages.

Zain et al., "Cleanup of Wall-Building Filter Cakes," Presented at the SPE Annual Technical Conference and Exhibition, Houston, Texas, Oct. 1999, 14 pages.

* cited by examiner

FILTER CAKE REMOVAL TREATMENT FLUID WITH CHELATING AGENT AND VISCOELASTIC SURFACTANT

TECHNICAL FIELD

This disclosure relates to filter cake removal treatment fluid containing a chelating agent and viscoelastic surfactant and the methods of using thereof.

BACKGROUND

Drilling fluid, or drilling mud, aides the drilling of holes into a subterranean formation in the Earth's crust. The holes, called boreholes or wellbores, are typically drilled for the exploration or production of crude oil and natural gas, but can be drilled for other applications, such as for a water well. During the drilling, the drilling fluid cools and lubricates the drill bit and also carries and removes rock cuttings from the hole. The drilling fluid also provides hydrostatic pressure to prevent or reduce formation fluids from the subterranean formation entering into the hole during drilling. Drilling fluids, or treatment fluids more generally, include completion fluids, workover fluids, and drill-in fluids.

Drilling fluids are typically mixtures of solid additives present as discontinuous phases spread in a liquid continuous phase. The liquid is water in the case of the water-based drilling fluids (WBDF) or oil for the oil-based drilling fluids (OBDF). As indicated, the drilling fluids may be designed to achieve different operational objectives including lubrication of the drill bit and drill string, transferring the drilled cuttings out of the hole while drilling, and suspending cuttings when the fluid circulation is stopped. Another objective may be to prevent the formation fluids from invading the wellbore hole. In the drilling operation with the drilling fluid, wellbore stability may be promoted by forming a low-permeability film on the borehole wall labeled as filter cake, also called cake, mudcake, or wall cake. The filter cake may also reduce drilling fluid invasion into the drilled formation. Once the process of drilling is complete, the filter cake must be removed before production operations to prevent flow capacity issues and enhance injectivity through injection wells. However, some portions of the filter cake can be difficult to remove due to its stable chemical nature, e.g., low solubility of inorganic salts, or location, e.g., incomplete removal at an end portion of the wellbore.

SUMMARY

This disclosure describes technologies relating to treatment fluid compositions for filter cake removal and methods of filter cake removal, more specifically to fluid compositions containing a viscoelastic surfactant and a chelating agent, which can effectively dissolve or exfoliate highly resistant filter cake components such as barite.

In some implementations a reactive treatment fluid for filter cake removal includes: a base fluid; a chelating agent; a carbonate; an oxidizing salt; an organic acid; a viscoelastic surfactant (VES); and a base.

In an aspect, combinable with any other aspect, the base fluid is water.

In an aspect, combinable with any other aspect, the chelating agent includes an aminopolycarboxylic acid or a salt thereof.

In an aspect, combinable with any other aspect, the chelating agent includes diethylenetriamine pentaacetic acid (DTPA), hydroxyethyl ethylenediaminetriacetic acid (HEDTA), ethylenediaminetetraacetic acid (EDTA), nitrilotriacetic acid (NTA), ethyleneglycol-O,O'-bis(2-aminoethyl)-N,N,N',N'-tetraacetic acid (EGTA), hydroxyethyl iminodiacetic acid (HIDA), glutamic acid N,N-diacetic acid (GLDA), or a salt thereof.

In an aspect, combinable with any other aspect, the carbonate is potassium carbonate or cesium carbonate.

In an aspect, combinable with any other aspect, the oxidizing salt includes a chlorate or bromate.

In an aspect, combinable with any other aspect, the organic acid includes oxalic acid, formic acid, acetic acid, or lactic acid.

In an aspect, combinable with any other aspect, the VES includes erucylamidopropyl betaine.

In an aspect, combinable with any other aspect, the base includes potassium hydroxide.

In an aspect, combinable with any other aspect, the base fluid is from about 50 weight percent (wt. %) to about 70 wt. % of the reactive treatment fluid; the chelating agent is from about 1 wt. % to about 15 wt. % of the reactive treatment fluid; the carbonate is from about 5 wt. % to about 30 wt. % of the reactive treatment fluid; the oxidizing salt is from about 1 wt. % to about 20 wt. % of the reactive treatment fluid; the organic acid is from about 1 wt. % to about 15 wt. % of the reactive treatment fluid; and the base is from about 0.2 wt. % to about 5 wt. % of the reactive treatment fluid.

In an aspect, combinable with any other aspect, the reactive treatment fluid further includes an acid-generating material.

In an aspect, the acid-generating material includes polylactic acid (PLA), polyglycolic acid (PGA), an orthoester, or a polyanhydride.

In some implementations, a reactive treatment fluid for filter cake removal includes: water; diethylenetriamine pentaacetic acid (DTPA); a carbonate; an oxidizing salt; oxalic acid; a viscoelastic surfactant (VES); and a base.

In an aspect, combinable with any other aspect, a pH of the reactive treatment fluid is from about 9 to about 12.

In an aspect, combinable with any other aspect, the water is from about 50 weight percent (wt. %) to about 70 wt. % of the reactive treatment fluid; the DTPA is from about 1 wt. % to about 15 wt. % of the reactive treatment fluid; the carbonate is from 5 wt. % to 30 wt. % of the reactive treatment fluid; the oxidizing salt from about 1 wt. % to about 20 wt. % of the reactive treatment fluid; the oxalic acid is from about 1 wt. % to about 15 wt. % of the reactive treatment fluid; and the base is from about 0.2 wt. % to about 5 wt. % of the reactive treatment fluid.

In some implementations, a method of treating a wellbore for filter cake removal includes: injecting a reactive treatment fluid into a wellbore in a subterranean formation including a filter cake on a wall of the wellbore, the filter cake including a barite, the reactive treatment fluid including: a base fluid, a chelating agent, a carbonate, an oxidizing salt, an organic acid, a viscoelastic surfactant (VES), and a base; contacting the reactive treatment fluid with the filter cake in the wellbore, the reactive treatment fluid dissolving or exfoliating the barite from the wall into the reactive treatment fluid; and recovering the reactive treatment fluid including the barite removed from the wall.

In an aspect, combinable with any other aspect, the method further includes, prior to injecting the reactive treatment fluid into the wellbore, forming the wellbore by drilling, where the drilling forms the filter cake in the wellbore.

In an aspect, the drilling includes drilling using an oil-based drilling fluid (OBDF) including an oil, a polymer, and the barite.

In an aspect, combinable with any other aspect, the method further includes providing carbon dioxide ($CO_2$) into the wellbore.

In an aspect, combinable with any other aspect, the method further includes foaming the reactive treatment fluid with $CO_2$.

DETAILED DESCRIPTION

Implementations described herein provide filter cake removal treatment fluid compositions, or reactive treatment fluids. In some implementations, the reactive treatment fluids contain a chelating agent and a viscoelastic surfactant (VES). Also provided are methods of using the reactive treatment fluid to remove a filter cake from a wellbore in a subterranean formation. The compositions are applicable for both water-based filter cakes and oil-based filter cakes The compositions can effectively remove filter cake containing a mixture of barite and polymeric materials. In addition, the treatment fluid can also be effective in horizontal sections of the wellbore. In general, with some of the conventional fluids, addressing long horizontal sections of the wellbore during treatment can be difficult because reactive treatment fluids may deplete near the heel of the well, affecting its efficiency along the lateral length.

In various implementations, the reactive treatment fluid composition is an aqueous solution containing a chelating agent, a VES, and additives to help remove the resistant components in the filter cake, such as barite and certain carbonates, while maintaining the ability to dissolve other components. The additives can include one or more of a sulfate converter, a chelation activator, a pH control agent, and an oxidizing salt. In some implementations, the sulfate converter is potassium carbonate. In some implementations, the chelation activator is oxalic acid. In some implementations, the pH control agent is a base. In some implementations, the oxidizing salt is sodium bromate. The combined use of various components in the reactive treatment fluid can be particularly effective in dissolving and/or exfoliating different portions of the filter cake. For example, the chelating agent can be primarily responsible for dissolution of barite and calcium carbonate particles in the filter cake, while the oxidizing salt can attack polymeric materials. The VES can gel the reactive treatment fluid to provide a VES gel, which is useful in retaining the oxidizing salt and delivering it to an end portion of a horizontal portion of the wellbore. In some implementations, the injection of the reactive treatment fluid is combined or alternated with the injection of another treatment fluid, e.g., a fluid containing carbon dioxide ($CO_2$) to enhance the filter cake removal efficiency.

Figures 8A, 8B:
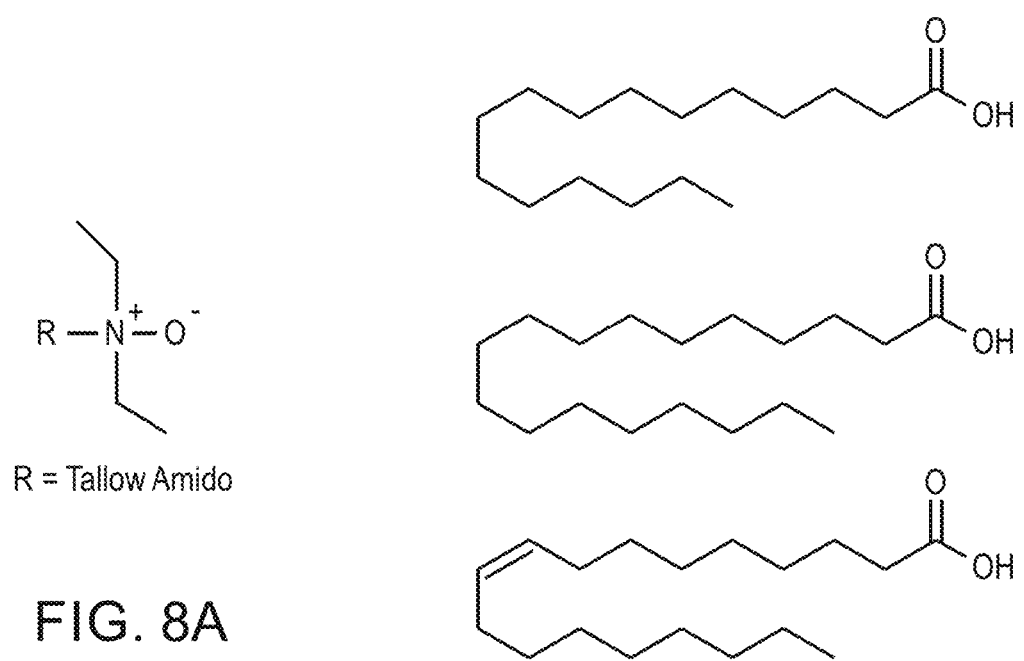
FIGS. 8A-8B are example chemical structures of nonionic surfactants for a viscoelastic surfactant (VES) for a reactive treatment fluid.
Figure 9:
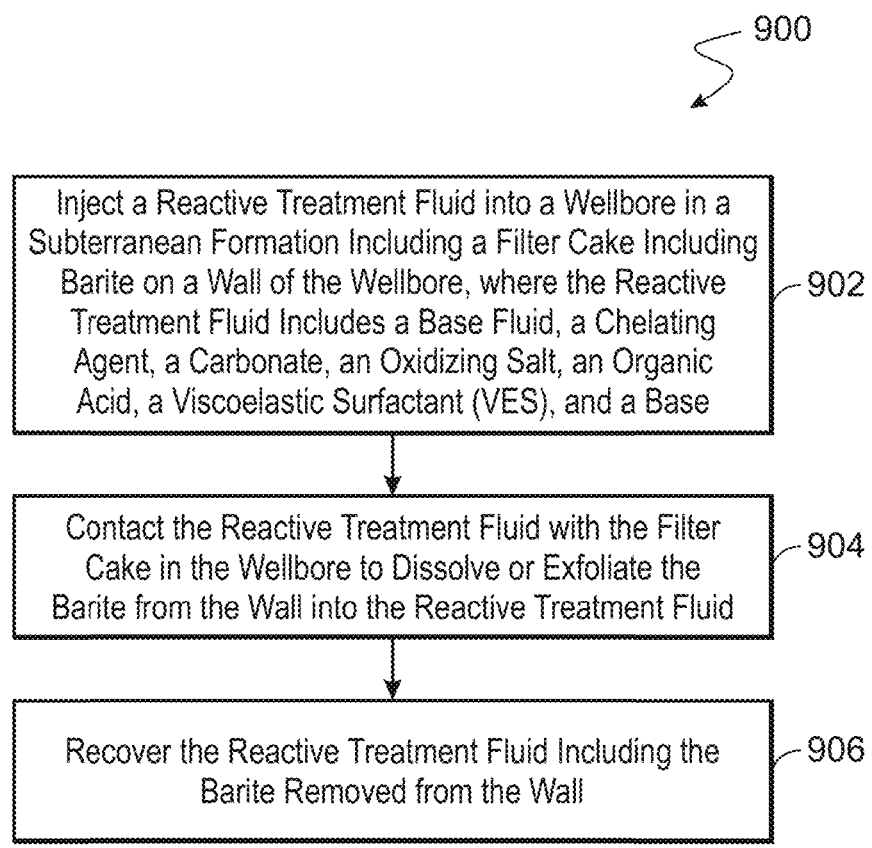
FIG. 9 is a process flow diagram of the process of filter cake removal.

In the following, the overview of the filter cake formation and removal is first provided referring to FIGS. 1, 2, and 3A-3C. The compositions of reactive treatment fluid in various implementations are then described referring to FIGS. 4A-4E, 5A-5C, 6A-6C, 7A-7C, and 8A-8B. FIG. 9 is an example process flow diagram for the filter cake removal process. Example compositions of the reactive treatment fluid are studied for their rheological properties and described referring to FIGS. 10 and 11. In this disclosure, the filter cake "removal" can include permeability enhancement of the filter cake.

Filter Cake Formation and Removal

Figure 1:
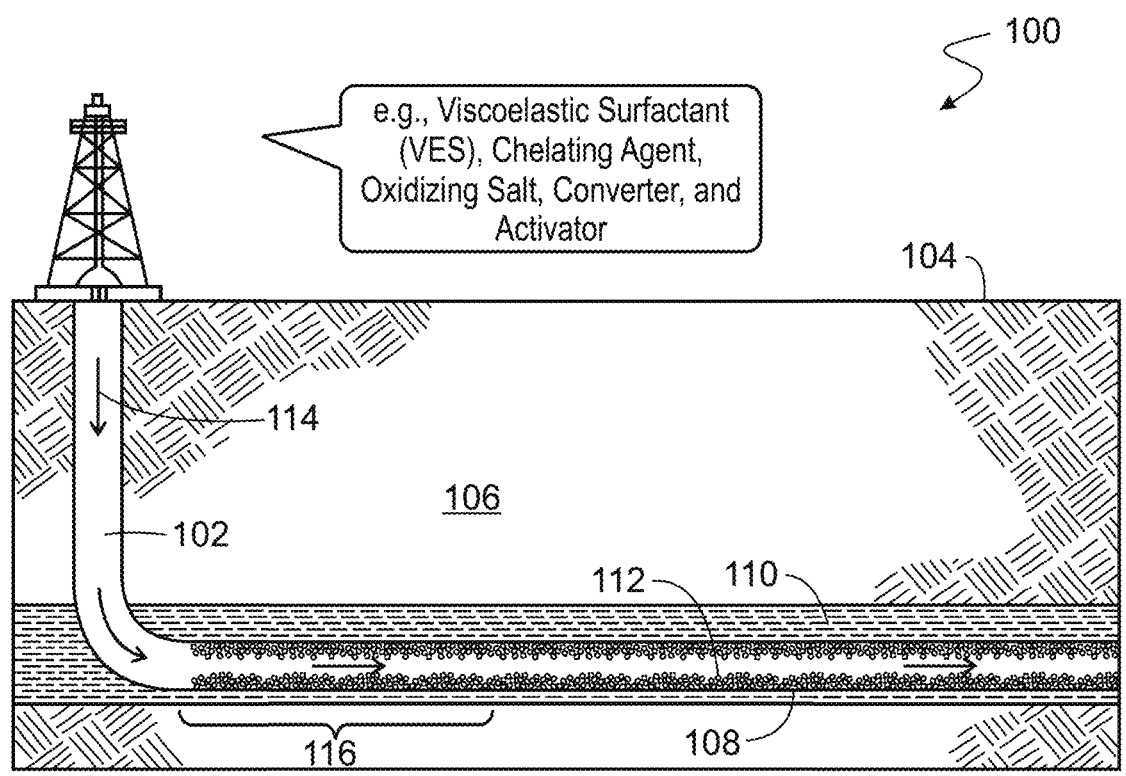
FIG. 1 is a diagram of a well having a wellbore formed through the Earth surface into a subterranean formation.

FIG. 1 is a diagram of a well 100 having a wellbore 102 formed through the Earth surface 104 into a subterranean formation 106. The wellbore 102 has a horizontal portion 108 in a hydrocarbon reservoir section 110 of the subterranean formation 106.

The wellbore 102 can be openhole but is generally a cased wellbore. The annulus between the casing and the subterranean formation 106 can be cemented. Perforations can be formed through the casing and cement into the subterranean formation 106. The perforations may allow both for flow of fracturing fluid into the subterranean formation 106 and for flow of produced hydrocarbon from the subterranean formation 106 into the wellbore 102.

The wellbore 102 has a filter cake 112 on a wall of the wellbore 102. As further described below, the filter cake 112 can be formed because of the drilling of the well 100. A treatment fluid 114 is injected into the wellbore 102 to remove the filter cake 112. In a conventional method, the treatment fluid 114 can use acid, such as hydrochloric acid, where the acid may be spent quickly and thus may only treat and remove the filter cake 112 in a small section 116 of the wellbore 102. In various implementations, the reactive treatment fluid can be tuned to have a desired rheology and functionality, e.g., acidity, such that the treatment fluid 114 can reach the end portion of the long horizontal portion of the wellbore 102.

In various implementations, a drilling fluid used to form the wellbore 102 is a water-based drilling fluid (WBDF) or oil-based drilling fluids (OBDF). Accordingly, the filter cake 112 can have a composition determined by the type of the drilling fluid used and its process conditions.

The WBDF can use fresh water, salt water, or seawater as a continuous phase. The WBDF can contain one or more of viscosifiers, fluid loss control agents, weighting agents, lubricants, emulsifiers, corrosion inhibitors, salt and pH control agents with different type of additives based on well conditions and reservoir properties. Examples of the weighting agents include calcium carbonate, barite, ilmenite, hematite and manganese tetroxide. In some implementations, the weighting agent accounts for approximately 80 weight percent (wt. %) of the WBDF, e.g., from about 70 wt. % to about 90 wt. %, or from about 65 wt. % to about 85 wt. %. For rheological control, different types of polymers can be used, for example, xanthan gum, lignosulfonates and partially hydrolyzed poly(acrylamide) (PHPA). For fluid loss control, a mixture of starch and polyanionic cellulose (PAC), carboxymethyl cellulose, carboxymethyl starch, hydroxypropyl starch can be used. The WBDF can further contain sodium and potassium silicate as inhibitor additives at high pH to prevent shale swelling.

On the other hand, OBDF can contain diesel oil or palm oil as a base fluid. Further, the OBDF can contain a water-resistant polymer such as ethylene-propylene polymer, maleated polymer, organophilic clay, and poly-a-olefins. In some implementations, the water-resistant polymer is used as a rheology modifier, e.g., viscosifier. The drilling fluid 212 can also contain a weighting agent and other additives, e.g., emulsifier, wetting agent, biocide, deformer, and lubricant. The weighting agent can include various inorganic salts such as calcium carbonate, bentonite, barite, hematite, ilmenite, and manganese tetroxide.

Figure 2:
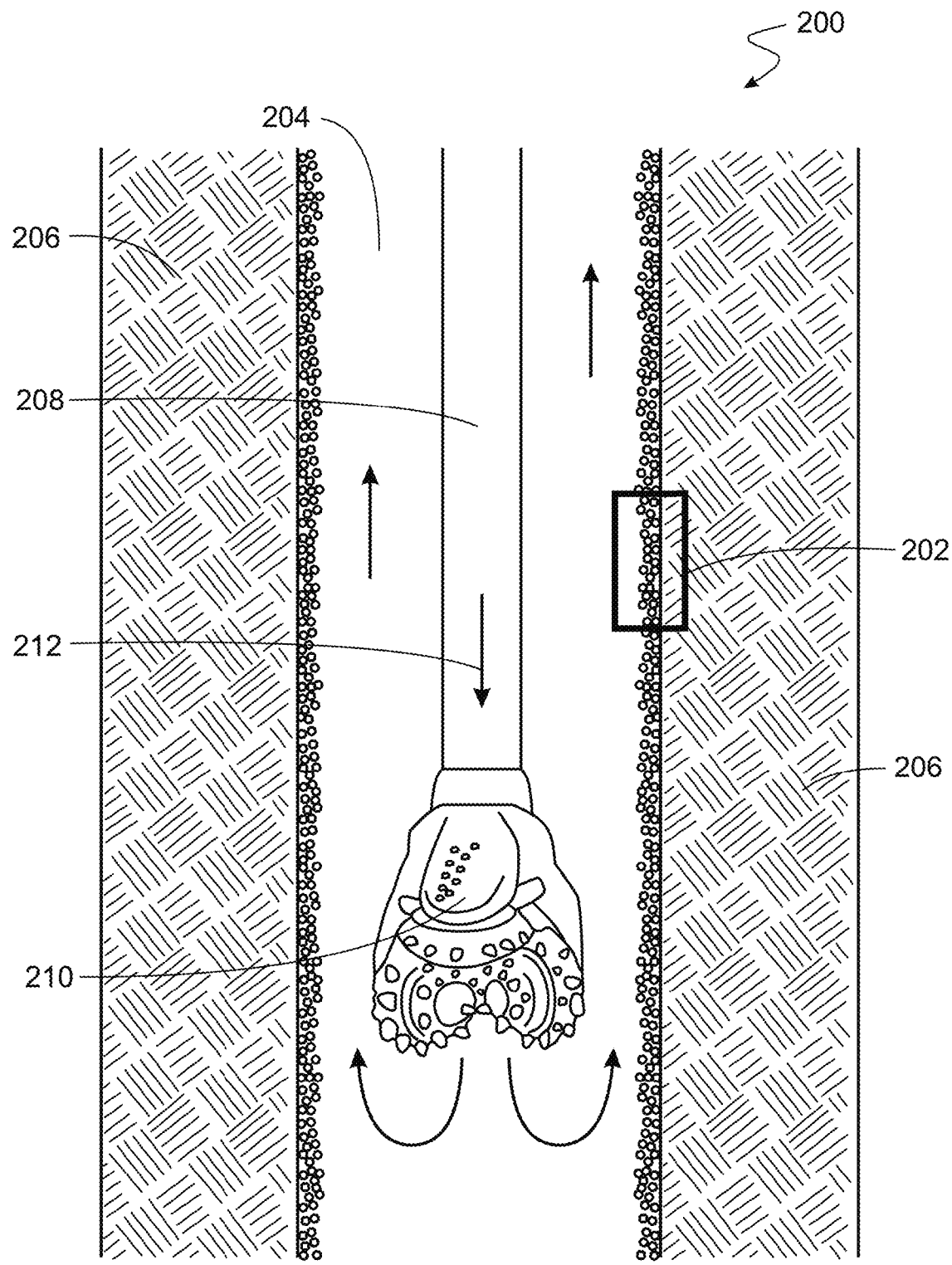
FIG. 2 is a diagram of a well having a filter cake.

FIG. 2 is a diagram of a well 200 having a filter cake 202. The well 200 includes a wellbore 204 formed in a subterranean formation 206. The face of the subterranean formation 206 is formed by drilling is the wellbore 204 wall. A drill string 208 and drill bit 210 are disposed in the wellbore 204. In the drilling operation, drilling fluid 212 is injected into the drill string 208. The drilling fluid 212 can be pumped, for example, by mud pumps from the Earth surface into the drill string 208 in the wellbore 204.

The well site of the well 200 can include surface equipment, such as a mounted drilling rig, piping, and storage tanks, at the Earth surface. The surface equipment may include the aforementioned mud pumps that can be, for example, centrifugal pumps, positive displacement pumps, reciprocating pumps, or piston pumps.

The wellbore diameter can be, for example, in a range from about 3.5 inches (8.9 centimeters) to about 30 inches (76 centimeters), or outside of this range. The depth of the wellbore 204 can range from about 300 feet (100 meters) to more than about 30,000 feet (9,100 meters). The wellbore 204 can be vertical, horizontal, or deviated, or any combinations thereof.

To form a hole in the ground, the drill bit 210 with cutters can be lowered into the wellbore 204 and rotated to break the rock of the subterranean formation 206. In the rotation, the cutters may interface with the subterranean formation 206 to grind, cut, scrape, shear, crush, or fracture rock to drill the hole. The drill bit 210 can be a component of the drill string 208 or coupled to the drill string 208. The drill bit 210 can be lowered via the drill string 208 into the wellbore 204 (borehole) to drill the wellbore 204 into the subterranean formation 206 in the Earth crust. In operation, the drilling fluid 212, also known as drilling mud, is circulated down the drill string 208 and through multiple nozzles in the drill bit 210 to the bottom of the wellbore 204. The drilling fluid 212 may then flow upward towards the surface through an annulus between the drill string 208 and the wall of the wellbore 204. The drilling fluid 212 may cool the drill bit 210, apply hydrostatic pressure upon the subterranean formation 206 penetrated by the wellbore 204 to prevent or reduce fluids from flowing into the wellbore 204, reduce the torque and the drag force induced by the friction between the drill string 208 and the wellbore 204 wall, carry the formation cuttings up to the surface, and so forth.

The filter cake 202 can be formed via the circulating drilling fluid 212. Solids from the drilling fluid 212 can build on the surface of the subterranean formation 206, which is the wall of the wellbore 204, as the filter cake 202. In some implementations, the filter cake 202 form as solids of the drilling fluid 212 slurry deposit on permeable portions of the subterranean formation 206 face under wellbore 204 pressure. Initially, as the filter cake 202 is being deposited on the surface of the permeable material, the material firstly serves as a filter and allows the liquid portions, e.g., filtrate, of the drilling fluid 212 to pass through and trapping the insoluble solid portion as a cake. Over time, enough filter cake gathers on the surface of the permeable material, allowing little or no further liquid invasion. The drilling fluid 212 can be configured for formation of the filter cake 202. This filter cake 202 may be deposited on the porous rocks under overbalance pressure conditions. The formation of filter cake 202 can advantageously prevent or reduce further loss of drilling fluid 212 into the subterranean formation 206 and reduce solid invasion as well. In other words, the filter cake 202 can help prevent loss circulation and formation damage that would be caused by fines and filtrate invasion into reservoir rocks. A filter cake 202 that is relative thin and with low permeability may generally be desirable. For example, the filter cake 202 can have a thickness from about 0.5 mm to about 3 mm, e.g., from about 1 mm to about 2 mm. The permeability of the filter cake 202 can be from about 0.001 millidarcy (md) ($0.987 \times 10^{-18}$ m$^2$) to about 0.1 md ($0.987 \times 10^{-16}$ m$^2$).

Figure 3A:
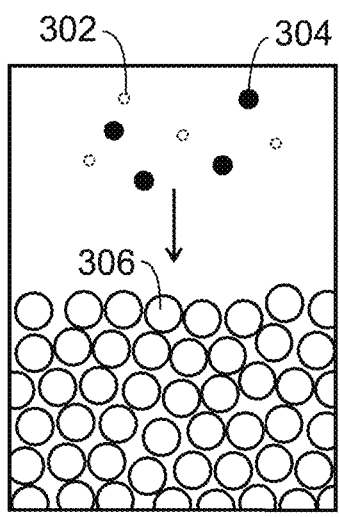
FIGS. 3A-3C are diagrams of a sequence of particle buildup of filter cake on the surface of the subterranean formation in a wellbore.
Figure 3B:
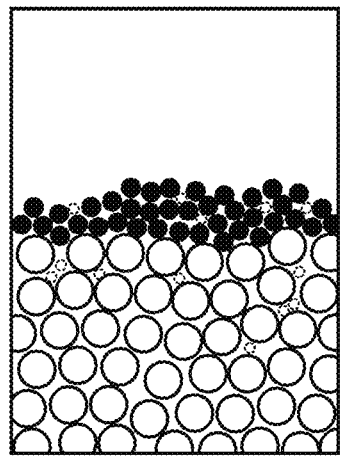
Figure 3C:
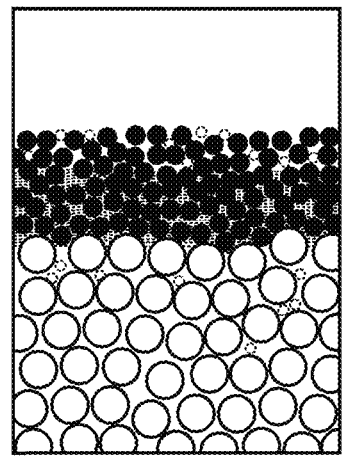

FIGS. 3A-3C are diagrams of a sequence of particle buildup of filter cake on the surface of the subterranean formation in a wellbore. As illustrated in FIGS. 3A-3C, particles 302, 304 signify solid components of the drilling fluid formulation. The circles 306 signify the granular porous nature of the subterranean rock formation, where some of the filter cake can invade into the formation. In FIG. 3A, the particles 302, 304 in the drilling fluid are depicted flowing toward the formation, as indicated by an arrow. In FIG. 3B, in the time sequence later in time, the particles 302, 304 accumulate on the formation face, which includes the wellbore wall, forming the filter cake. In some implementations, as illustrated in FIG. 3B, some of the smaller particles 302 may invade into the formation. FIG. 3C illustrates the time sequence is later in which the filter cake may be considered formed. The filter cake may be characterized as the collection of particles 302, 304 at the formation face. The build of the particles 302, 304 including the dense accumulation of the smaller particles 302 may desirably provide for low permeability of the filter cake.

After the drilling process, a filter cake removal process can be performed prior to further well operations. However, the complexity of the filter cake compositions may pose challenges in its removal. Since the filter cake is formed during the drilling process, the filter cake can include various materials such as polymers and inorganic salts derived from the drilling fluid. In some implementations, the primary component of the filter cake is from the weighting agent of the drilling fluid used, e.g., barite and calcium carbonate.

In some implementations, the reactive treatment fluid is specifically tailored to attack an oil-based filter cake. Such an oil-based filter cake can contain oils, e.g., diesel oil or palm oil, a water-resistant polymer such as ethylene-propylene polymer, maleated polymer, organophilic clay, and poly-a-olefins. Further, the oil-based filter cake can include various inorganic salts such as calcium carbonate, bentonite, barite, ilmenite, and manganese tetroxide.

One challenge in effectively removing the filter cake is the complexity of filter cake compositions. An effective filter cake treatment fluid involves multifunctionality, where it can degrade and attack both polymeric materials, e.g., gelling polymer and fluid loss agent, and inorganic salts such as barite and carbonate species. The polymeric materials in the filter cake include polysaccharides such as xanthan, carboxymethyl cellulose, polyacrylamide, partially hydrolyzed acrylamide, carboxymethyl hydroxypropyl guar gum (CMHPG), hydroxypropyl guar gum (HPG), starch, and chitosan.

Chelating Agent for Reactive Treatment Fluid

The reactive treatment fluid can be an aqueous solution containing a chelating agent. The base fluid to prepare the reactive treatment fluid can include fresh water, brine water, pond water, tap water, flowback water, or sea water. In various implementations, the base fluid is from about 50 weight percent (wt. %) to about 70 wt. % of the reactive treatment fluid, e.g., from about 55 wt. % to about 70 wt. %, from about 60 wt. % to about 70 wt. %, from about 65 wt. % to about 70 wt. %, from about 50 wt. % to about 65 wt. %, from about 50 wt. % to about 60 wt. %, or from about 50 wt. % to about 55 wt.

Figure 4A:
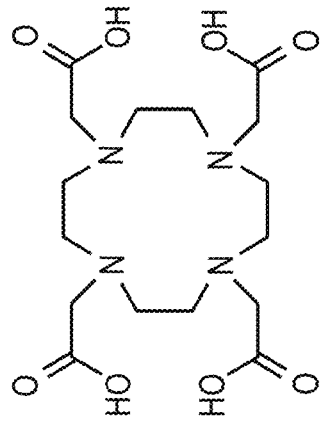
FIGS. 4A-4E are example chemical structures of a chelating agent for a viscoelastic surfactant (VES) for a reactive treatment fluid.
Figure 4B:
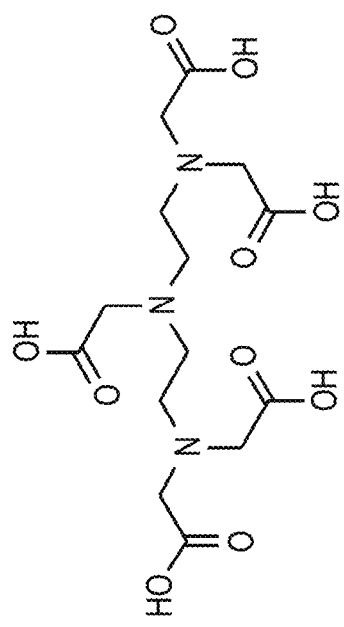
Figure 4C:
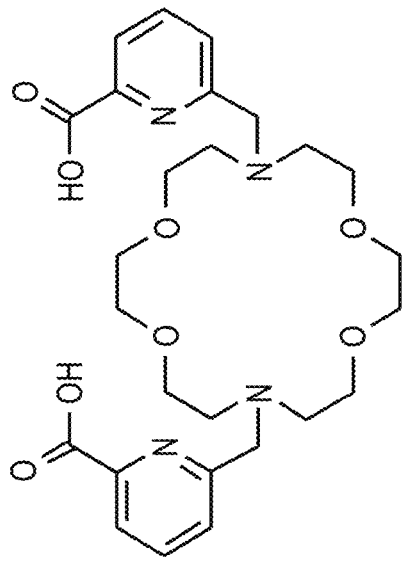
Figure 4D:
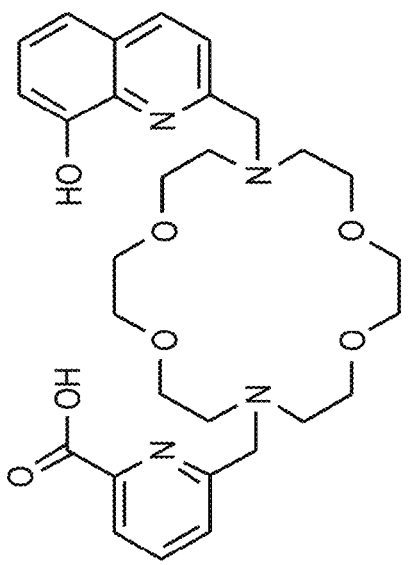
Figure 4E:
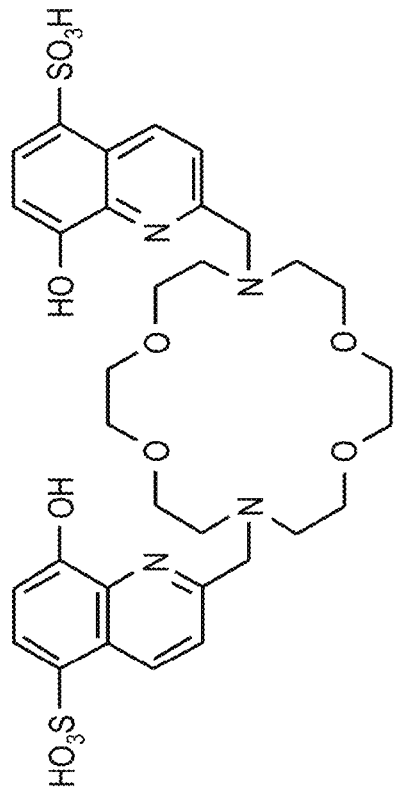

In various implementations, the chelating agent in the reactive treatment fluid is capable of dissolving, fragmenting, or exfoliating the resistant inorganic salt species such as barite and calcium carbonate particles into the solution phase. These species can then be removed from the wall of the wellbore and the well system. The chelating agent can be less corrosive and more environmentally friendly in comparison to mineral acids. In some implementations, the chelating agent includes an aminopolycarboxylic acid. It can be used in its salt form, e.g., sodium, potassium, cesium salt. Examples of the chelating agent include, but are not limited to, diethylenetriamine pentaacetic acid (DTPA), hydroxyethyl ethylenediaminetriacetic acid (HEDTA), ethylenediaminetetraacetic acid (EDTA), nitrilotriacetic acid (NTA), ethyleneglycol-O,O'-bis(2-aminoethyl)-N,N,N',N'-tetraacetic acid (EGTA), hydroxyethyl iminodiacetic acid (HIDA), glutamic acid N,N-diacetic acid (GLDA), tetraaza macrocycle (DOTA), macropa, and macropaquin. Chemical structures of some chelating agents are illustrated in FIGS. 4A-4E: DOTA (FIG. 4A), DTPA (FIG. 4B), macropa (FIG. 4C), macropaquin (FIG. 4D), and macroquin-$SO_3$ (FIG. 4E).

In various implementations, the chelating agent is from about 1 wt. % to about 15 wt. % of the reactive treatment fluid, e.g., from about 5 wt. % to about 15 wt. %, from about 10 wt. % to about 15 wt. %, from about 1 wt. % to about 10 wt. %, or from about 1 wt. % to about 5 wt. %. In some implementations, more than one type of chelating agent is used.

Sulfate Converter for Reactive Treatment Fluid

The reactive treatment fluid can further include a sulfate converter that can interact with sulfate species in the filter cake such as barite and convert it to carbonate species. For example, barite ($BaSO_4$) can be converted to barium carbonate ($BaCO_3$), which has a higher solubility than the sulfate counterpart. The converted carbonate species can then be dissolved in the reactive treatment fluid, e.g., catalyzed by acid or through chelation.

In various implementations, the sulfate converter includes a carbonate such as potassium carbonate ($K_2CO_3$), sodium carbonate ($Na_2CO_3$), and cesium carbonate ($Cs_2CO_3$). In some implementations, the sulfate converter can effectively convert the sulfate species at a high pH, e.g., from 12 to 14.

In some implementations, the amount of the sulfate converter included in the reactive treatment fluid is determined according to the amount of barite in the filter cake. In one implementation, a stoichiometric amount of the sulfate converter is used to react with the barite.

In various implementations, the sulfate converter is from about 5 wt. % to about 30 wt. % of the reactive treatment fluid, e.g., from about 10 wt. % to about 30 wt. %, from about 15 wt. % to about 30 wt. %, from about 20 wt. % to about 30 wt. %, from about 25 wt. % to about 30 wt. %, from about 5 wt. % to about 25 wt. %, from about 5 wt. % to about 20 wt. %, from about 5 wt. % to about 15 wt. %, or from about 5 wt. % to about 10 wt. %. In some implementations, more than one type of sulfate converter is used.

Chelation Activator for Reactive Treatment Fluid

The reactive treatment fluid can further include a chelation activator that can facilitate the chelation of the resistant filter cake components by the chelating agent. In various implementations, the chelation activator includes an organic acid such as oxalic acid, formic acid, acetic acid, and lactic acid. In some implementations, the organic acid can be directly added to the reactive treatment fluid.

In various implementations, the chelation activator is from about 1 wt. % to about 15 wt. % of the reactive treatment fluid, e.g., from about 3 wt. % to about 15 wt. %, from about 5 wt. % to about 15 wt. %, from about 8 wt. % to about 15 wt. %, from about 10 wt. % to about 15 wt. %, from about 13 wt. % to about 15 wt. %, from about 1 wt. % to about 13 wt. %, from about 1 wt. % to about 10 wt. %, from about 1 wt. % to about 8 wt. %, from about 1 wt. % to about 5 wt. %, or from about 1 wt. % to about 3 wt. %. In some implementations, more than one type of chelation activator is used.

Viscoelastic Surfactant (VES) for Reactive Treatment Fluid

The reactive treatment fluid can be an aqueous solution containing one or more VES. The VES can induce gelation of the reactive treatment fluid to provide a VES gel. In various implementations, the VES concentration in the base fluid, e.g., water, is from about 1 volume percent (vol. %) to about 15 vol. %, for example, from about 4 vol. % to about 10 vol. %, depending on the temperature and viscosity requirement. For example, the VES concentration can be from about 6 vol. % to about 10 vol. %, from about 8 vol. % to about 10 vol. %, from about 4 vol. % to about 8 vol. %, or from about 4 vol. % to about 6 vol. %. In other implementations, the VES concentration is from about 0.1 wt. % to about 10 wt. %, e.g., from about 1 wt. % to about 10 wt. %, from about 5 wt. % to about 10 wt. %, from about 0.1 wt. % to about 5 wt. %, or from about 0.1 wt. % to about 1 wt. %.

The VES can include a zwitterionic or amphoteric surfactant, a cationic surfactant, an anionic surfactant, a nonionic surfactant, or a combination of cationic and anionic surfactants. The base fluid for the reactive treatment fluid can be fresh water, seawater, produced water, treated water, or a combination thereof.

Figure 5A:
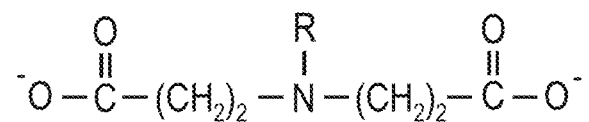
FIGS. 5A-5C are example chemical structures of zwitterionic surfactants for a viscoelastic surfactant (VES) for a reactive treatment fluid.
Figure 5B:
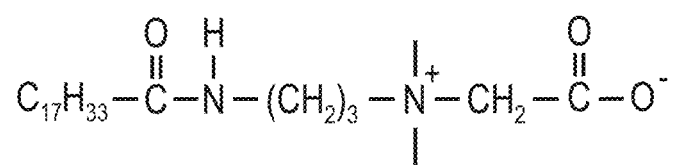
Figure 5C:
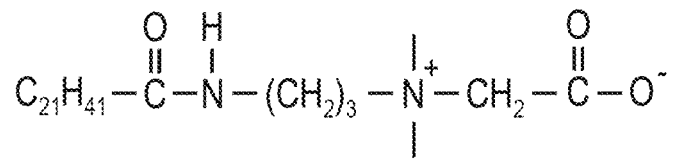

The zwitterionic surfactant can be a betaine, phosphobetaine, or sultaine. The zwitterionic surfactant can include dihydroxyl alkyl glycinate, alkyl ampho acetate or propionate, alkyl amidoamine oxide, gemini VES, alkyl betaine, alkyl amidopropyl betaine, and alkylimino mono- or dipropionates derived from waxes, fats, or oils. FIGS. 5A-5C are example chemical structures of zwitterionic surfactants for a VES for a reactive treatment fluid: disodium tallowiminodipropionate (FIG. 5A), disodium oleamidopropyl betaine (FIG. 5B), and erucylamidopropyl betaine (FIG. 5C). In FIG. 5A, R=tallow.

Figure 6A:
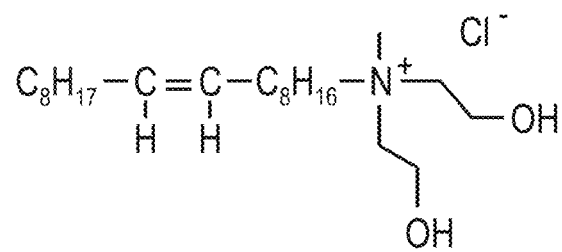
FIGS. 6A-6C are example chemical structures of cationic surfactants for a viscoelastic surfactant (VES) for a reactive treatment fluid.
Figure 6B:
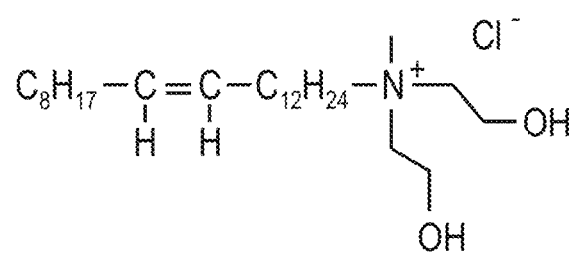
Figure 6C:
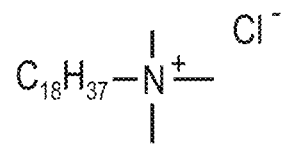

For cationic surfactants, examples include, but are not limited to, alkylammonium salts. FIGS. 6A-6C are example chemical structures of such salts: oleyl methyl bis(2-hydroxyethyl)ammonium chloride (FIG. 6A), erucyl bis(2-hydroxylethyl)methylammonium chloride (FIG. 6B), and N,N,N, trimethyl-1-octadecammonium chloride (FIG. 6C). Other alkylammonium salts as the cationic surfactant can include cetyltrimethylammonium bromide (CTAB) or dimethylene-1,2-bis(dodecyldimethylammonium bromide). The cationic surfactant can be associated with inorganic anions, such as sulfate, nitrate, and halide. The cationic surfactant can be associated with organic anions, such as salicylate, functionalized sulfonates, chlorobenzoates, phenates, picolinates, and acetates. The cationic surfactant can alternatively be associated with an oxidizing anion, such as chlorate, bromate, perchlorate, chlorite, hypochlorite, persulfate, iodate, bromite, hypobromite, perborate, dichromate, permanganate, ferrate, percarbonate, nitrite, and nitrate.

Figure 7A:
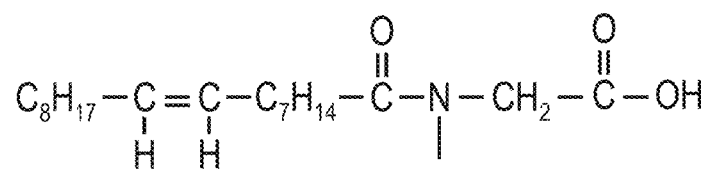
FIGS. 7A-7C are example chemical structures of anionic surfactants for a viscoelastic surfactant (VES) for a reactive treatment fluid.
Figure 7B:
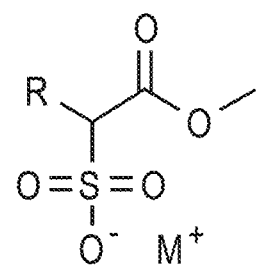
Figure 7C:
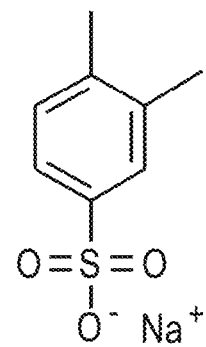

Examples of anionic surfactants include alkyl sarcosinates or sulfonates. FIGS. 7A-7C are example chemical structures of anionic surfactants. FIG. 7A illustrates oleoyl sarcosine as an example of an alkyl sarcosinate. In some implementations, the oleoyl sarcosine constitutes about 94% of the sarcosinate product. FIGS. 7B and 7C illustrate methyl ester sulfonate and sodium xylene sulfonate, respectively, as examples of sulfonates. In FIG. 7B, R is an alkyl chain with 10-30 carbon atoms.

Examples of nonionic surfactants include amine oxides. FIGS. 8A and 8B illustrates tallow amido propylamide oxide (TAPAO) and three major components of the tallow amido substituent, respectively.

In one implementation, the VES components for the reactive treatment fluid can include a combination of cationic and anionic surfactants, e.g., N,N,N-trimethyl-1-octadecammonium chloride and sodium xylene sulfonate, where the total surfactant concentration ranges from about 0.1 wt. % to about 10 wt. %, e.g., about 0.5 wt. % to about 7 wt. %. For example, the total surfactant concentration can be between about 1 wt. % and about 7 wt. %, about 1 wt. % and about 5 wt. %, or about 3 wt. % and about 5 wt. %.

Oxidizing Salt for Reactive Treatment Fluid

In various implementations, the reactive treatment fluid contains a reactive breaker such as an oxidizing salt. The reactive breaker can break polymeric materials in the filter cake. The concentration of the oxidizing salt in the reactive treatment fluid can be from about 1 wt. % to about 20 wt. % or from about 1 wt. % to about 10 wt. %. In some implementations, the concentration is at least about 3 wt. %, at least about 5 wt. %, at least about 7 wt. %, or at least about 10 wt. %. In some implementations, the reactive breaker even at high concentration, e.g., saturated in the treatment fluid, does not affect the gelling performance of the VES, but may break polymer upon exposure. By utilizing a gel, some of the oxidizing salt in the treatment fluid can extend across the horizontal section of the wellbore. The oxidizing salt as the breaker may be at or below saturated conditions in the reactive treatment fluid. The oxidizing salt can exceed saturation. The concentration of the oxidizing salt can be in excess of that to break the polymer. The concentration of the oxidizing salt in the reactive treatment fluid may be specified based on the thickness of the filter cake and the particular well or section of the wellbore.

In various implementations, the reactive breaker can attack and degrade organic materials in the geological formation. The oxidizing salts are generally inert to oxidation. Examples of the oxidizing salt include lithium chlorate ($LiClO_3$), sodium chlorate ($NaClO_3$), potassium chlorate ($KClO_3$), magnesium chlorate [$Mg(ClO_3)_2$], calcium chlorate [$Ca(ClO_3)_2$], strontium chlorate [$Sr(ClO_3)_2$], barium chlorate [$Ba(ClO_3)_2$], lithium bromate ($LiBrO_3$), sodium bromate ($NaBrO_3$), potassium bromate ($KBrO_3$), magnesium bromate [$Mg(BrO_3)_2$], calcium bromate [$Ca(BrO_3)_2$], strontium bromate [$Sr(BrO_3)_2$], and barium bromate [$Ba(BrO_3)_2$]. Other oxidizers that can be used include magnesium peroxide, calcium peroxide, sodium nitrate, sodium nitrite, sodium persulfate, potassium persulfate, sodium tetraborate, sodium percarbonate, sodium hypochlorite, an iodate salt, a periodate salt, a dichromate salt, a chlorite salt, a hypochlorite salt, and a permanganate salt. The iodate salt may be a salt of $IO_3$ with lithium, sodium, potassium, or magnesium, among others. Hydrogen peroxide as an oxidizer can also be used.

In addition to provide the ability to degrade the polymeric materials and others in the filter cake, the inorganic oxidizer salts promote formation of micelles, such as cylindrical or worm-like micelles, to increase viscosity of the reactive treatment fluid.

Acid-Generating Material for Reactive Treatment Fluid

In addition, in some implementations, the reactive treatment fluid further contains an acid-generating material that is neutral during mixing on the Earth surface and initial pumping into the wellbore. The generated acid can dissolve the inorganic salt in the filter cake. In some implementations, heat can be used as a trigger for acid generation. For example, once the treatment fluid increases in temperature in the wellbore due to heat provided by the subterranean formation, acid may be generated by the acid-generating material. Other triggers may also cause the reaction to occur that results in acid formation such as pH change. The acid may lower the viscosity of the gel. The acid may dissolve some weighting materials, e.g., calcium carbonate, of the filter cake.

Multiple techniques can be employed to generate acid in situ. A wide range of acids can be produced depending on the technique. In some implementations, an acid generated is hydrochloric acid. The generation of the acid can thus involve liberation of hydrogen ions or hydrogen chloride.

A first technique for acid generation is the use of degradable polymeric materials. The solid acid-generating material can degrade over time, e.g., due to formation temperature, to generate acid. Examples of degradable polymeric materials include polylactic acid (PLA), also known as polylactide, polyglycolic acid (PGA), an orthoester, or a polyanhydride, or any combinations thereof.

The size of the particles can be, for example, in ranges of about 20 microns (m) to about 2 mm, about 100 microns to about 1 mm, about 100 microns to about 500 microns, about 125 microns to about 400 microns, or about 150 microns to about 200 microns. In some implementations, the particular solid acid-generating material is selected at least in part on the formation temperature or well temperature. For instance, in some implementations, PLA is used for wells have higher temperature, e.g., at least about 200° F. (93° C.) or in a range of about 200° F. (93° C.) to about 350° F. (177° C.). In another example, PGA may be utilized for wells with lower temperature, such as less than about 200° F. (93° C.) or in a range of about 140° F. (60° C.) to about 200° F. (93° C.).

A second technique to generate acid in situ is to incorporate an ester as the acid-generating material into the reactive treatment fluid. As the reactive treatment fluid is applied to the wellbore, the esters may hydrolyze over time to generate acid including due to temperature of the subterranean formation or wellbore. The esters can be, for example, of carboxylic acid. Fast degrading esters can be utilized for wellbores in subterranean formations having lower temperatures such as less than about 200° F. (93° C.) or in a range of about 140° F. (60° C.) to about 200° F. (93° C.). In contrast, slow hydrolyzing esters may be utilized for wellbores in subterranean formations having higher temperatures, e.g., at least about 200° F. (93° C.).

A third technique to generate acid in situ is to use ammonium salt as the acid-generating material to the reactive treatment fluid, where an acid is formed by the oxidation of the ammonium salt. In various implementations, the oxidation can be induced by an oxidizing salt present in the reactive treatment fluid. In some implementations, the oxidizing salt is the same oxidizing salt as the reactive breaker as described above. If so, the oxidizing salt in this acid generation can be excess oxidizing salt from the polymer breaking. This oxidizing salt may also be in excess to that needed to react with the ammonium for acid generation. In other implementations, the oxidizing salt can be different than the oxidizing salt that is the reactive breaker. The oxidizing salt may be a second oxidizing salt in addition to the oxidizing salt as the reactive breaker that breaks the polymer in the filter cake.

The type of acid that can be generated can depend on the anion of the ammonium salt. For example, citric acid can be generated from the oxidation of ammonium citrate, sulfonic acid from sulfonate, and sulfuric acid from sulfate. The length of an induction time prior to acid being generated can be controlled by the counter anion with the ammonium salt or by addition of nonoxidizing salts. In some implementations, addition of lithium-based salts delays the formation of acid. In some implementations, addition of bromide-based salts delays the formation of acid.

Examples of the ammonium salt include ammonium halide, e.g., ammonium fluoride, ammonium chloride, ammonium bromide, ammonium iodide, and mixtures thereof. In some implementations, the ammonium salt can include an anion that is also an oxidizing agent. For instance, the ammonium salt can include ammonium persulfate. Further, the ammonium salt can include a polyatomic anion such as sulfate, hydrogen sulfate, thiosulfate, nitrite, nitrate, phosphite, phosphate, monohydrogen phosphate, dihydrogen phosphate, carbonate, and combinations thereof.

In some implementations, the ammonium salt includes an N-substituted ammonium salt, e.g., mono-substituted, di-substituted with one or two alkyl groups, or tri-substituted with three alkyl groups. Examples of the alkyl groups include methyl, ethyl, propyl, and butyl. In some implementation, the ammonium salt is not a tri-substituted ammonium salt or a tetra-substituted ammonium salt.

Other examples of the ammonium salt include ammonium alkylsulfonates, ammonium arylsulfonates, ammonium alkarylsulfonates, or any combinations thereof. Further, the ammonium salt can include substituted, unsubstituted ammonium alkylsulfonates, ammonium arylsulfonates, or combinations thereof. In various implementations, an alkyl group of an alkylsulfonate anion is substituted with one or more of halogen, —OR, and —SR, wherein R is hydrogen or a $C_{1-6}$ alkyl. In some implementations, the ammonium salt is selected from ammonium methanesulfonate, ammonium ethanesulfonate, ammonium propanesulfonate, ammonium butanesulfonate, ammonium trifluoromethanesulfonate, ammonium perfluorobutanesulfonate, ammonium chlorobenzenesulfonate, ammonium p-iodobenzenesulfonate, ammonium benzenesulfonate, ammonium p-toluenesulfonate, ammonium camphorsulfonate, and combinations thereof. Tn ammonium salt can also be selected from ammonium methanesulfonate, ammonium trifluoromethanesulfonate, and ammonium perfluorobutanesulfonate. The ammonium salt can also include anions of formate, citrate, oxalate, ascorbate, acetate, trifluoroacetate, or other carboxylates.

In some implementations, the amount or concentration of acid-generating material, e.g., degradable polymeric materials, esters, or ammonium salts, to specify to include in the reactive treatment fluid is correlative with the amount or concentration of the target component, e.g., inorganic salts, in the filter cake.

Inverting Surfactant for Reactive Treatment Fluid

In various implementations, the reactive treatment fluid can further include an inverting surfactant encapsulated in a degradable material. This addition can be particularly useful in addressing the difficulty of removing the oil-based filter cake. In some implementations, the degradable material encapsulating the inverting surfactant degrades at the wellbore temperature and releases the inverting surfactant. Subsequently, the inverting surfactant can invert the oil-based filter cake to enhance its miscibility or solubility in the aqueous phase of the fluid, thereby promoting the breakage of the filter cake. In some implementations, the inverting surfactant has a hydrophile-lipophile balance (HLB) of at least about 12.

Other Additives for Reactive Treatment Fluid

The reactive treatment fluid can further include a pH control agent. In various implementations, a base is added to the reactive treatment fluid to increase the pH. The base can include, for example, potassium hydroxide (KOH) or sodium hydroxide (NaOH). In some implementations, the pH of reactive treatment fluid can be adjusted to from about 6 to about 12, e.g., from about 7 to about 12, from about 8 to about 12, from about 9 to about 12, from about 10 to about 12, from about 11 to about 12, from about 6 to about 11, from about 6 to about 10, from about 6 to about 9, from about 6 to about 8, or from about 6 to about 7. In some implementations, the pH control agent is from about 0.2 wt. % to about 5 wt. % of the reactive treatment fluid, e.g., from about 0.5 wt. % to about 5 wt. %, from about 1 wt. % to about 5 wt. %, from about 2 wt. % to about 5 wt. %, from about 3 wt. % to about 5 wt. %, from about 4 wt. % to about 5 wt. %, from about 0.2 wt. % to about 3 wt. %, from about 0.2 wt. % to about 1 wt. %. or from about 0.2 wt. % to about 0.5 wt. %.

In various implementations, the reactive treatment fluid contains one or more additives in addition those described herein. For example, the fluid can contain monovalent or divalent salts at a concentration of about 50 wt. % or less, e.g., from about 1 wt. % to about 50 wt. %, from about 1 wt. % to about 15 wt. %, or about 15 wt. % or less. These salts can promote micelle formation, such as wormlike or cylindrical micelles, to increase viscosity of the fluid. Examples of these salts include lithium fluoride (LiF), sodium fluoride (NaF), potassium fluoride (KF), magnesium fluoride ($MgF_2$), calcium fluoride ($CaF_2$), strontium fluoride ($SrF_2$), barium fluoride ($BaF_2$), lithium chloride (LiCl), sodium chloride (NaCl), potassium chloride (KCl), magnesium chloride ($MgCl_2$), calcium chloride ($CaCl_2$), strontium chloride ($SrCl_2$), barium chloride ($BaCl_2$), lithium bromide (LiBr), sodium bromide (NaBr), potassium bromide (KBr), magnesium bromide ($MgBr_2$), calcium bromide ($CaBr_2$), strontium bromide ($SrBr_2$), and barium bromide ($BaBr_2$). Certain salts, such as LiBr salts, can be particularly beneficial for delaying the oxidation of ammonium by bromate and, hence, delaying the formation of acid. This delaying feature can be useful for filter cake cleanup where it is desirable to place the reactive treatment fluid before it starts to react with the filter cake.

The inorganic oxidizer salt, e.g., as the reactive breaker, and these monovalent or divalent salts can be both effective in micelle formation. Therefore, in some implementations, the combined concentration of the inorganic oxidizer salt and the monovalent or divalent salt in the fluid can be controlled to provide the optical fluid performance. In some implementations, the combined concentration is at least about 1 wt. %, at least about 3 wt. %, at least about 5 wt. %, at least about 7 wt. %, at least about 10 wt. %, or at least about 12 wt. %, or at least about 15 wt. %.

Further, the reactive treatment fluid can contain other organic compounds, such as phthalic acid, salicylic acid, or their salts. The salicylate or other ion in the presence of the surfactant may cause the viscoelastic gel to form. In some implementations, the acid (nonionic) form of these compounds causes the viscoelasticity development to be delayed until the pH is altered, e.g., raised, and the anion is released. For example, the pH may be raised by adding urea that is hydrolyzed as the solution starts to heat after pumping into the wellbore and formation. This is a way of imparting some control over when the viscoelasticity develops. In some cases, carboxylic acid and the hydroxyl (OH) group in salicylic acid interacts with the quaternary ammonium group of the VES and acts as a crosslinker to link and make the micelles more robust. This aids formation of stable micelles and thus stable viscosity at formation temperatures.

In some implementations, the reactive treatment fluid further contains nanoparticles, e.g., silica, zirconium, or titanium nanoparticles, which can crosslink the micelles and improve the viscosity. Further, other additives can include organophilic clays and nanoclays that impart favorable electrostatic interactions, e.g., hydrogen bonding, and provide high viscosity for diversion and/or reduce total volume of the fluid needed in the formation to maintain sufficient viscosity. Other examples of possible additives for the reactive treatment fluid include buffer, sale inhibitor, biocide, and corrosion inhibitor such as Cronox™ 242, PAEI-100, Basocorr™ PP, or Basocorr™ PM.

In some implementations, the VES-base reactive treatment fluid does not contain non-oxidizing salt, where the concentration of the oxidizing salt sufficiently enhances the viscosity of the fluid. Further, the reactive treatment fluid may need not contain an internal breaker, where the oxidizing salt can act as the reactive breaker, which can advantageously reduce the operational complexity.

Filter Cake Removal with the Reactive Treatment Fluid

In various implementations, the process of filter cake removal includes injecting the reactive treatment fluid into the wellbore that contains the filter cake. In some implementations, the filter cake removal can further include injecting another treatment fluid simultaneously or separately. In other words, the reactive treatment fluid can be pumped alone or in tandem with other fluids. In some implementations, the injection volume for the VES-based reactive treatment fluid per well is from 30 barrels (4.8 m$^3$) to 100 barrels (15.9 m$^3$), e.g., from 50 barrels (7.9 m$^3$) to 100 barrels (15.9 m$^3$), or from 30 barrels (4.8 m$^3$) to 50 barrels (7.9 m$^3$). The injection pressure can be from 1000 psi (6.9 MPa) to 6000 psi (41.4 MPa), e.g., from 2000 psi (13.8 MPa) to 6000 psi (41.4 MPa), from 3000 psi (20.7 MPa) to 6000 psi (41.4 MPa), from 4000 psi (27.6 MPa) to 6000 psi (41.4 MPa), from 5000 psi (34.5 MPa) to 6000 psi (41.4 MPa), from 1000 psi (6.9 MPa) to 5000 psi (34.5 MPa), from 1000 psi (6.9 MPa) to 4000 psi (27.6 MPa), from 1000 psi (6.9 MPa) to 3000 psi (20.7 MPa), or from 1000 psi (6.9 MPa) to 2000 psi (13.8 MPa). In one implementation, the process also includes recovering the reactive treatment fluid comprising the barite removed from the wall.

The reactive treatment fluid can be used to for a water-based filter cake or an oil-based filter cake. The composition of the reactive treatment fluid can be modified according to the nature of the filter cake and its composition.

In some implementations, the reactive treatment fluid is pumped as part of a series of steps for treating the oil-based filter cake. For example, prior to pumping the reactive treatment fluid, a pretreatment fluid can be pumped to change the wettability of the filter cake from oil-wet to water-wet. In some implementations, the pretreatment fluid contains an inverting surfactant encapsulated in a degradable material. The inverting surfactant can have a HLB of about 12 and higher.

Further, the filter cake removal process can include alternately pumping two or more types of treatment fluids into the wellbore, where one of the fluids is the reactive treatment fluid. In some implementations, carbon dioxide ($CO_2$) or a fluid containing $CO_2$ can be used as a second fluid. The second fluid can, for example, include only $CO_2$ or a mixture of $CO_2$ and oxidizers. In some implementations, the injection of $CO_2$ can enhance the cleanup of residues from the filter cake. The second fluid can also contain reactive gases. Examples of the reactive gases include chlorine dioxide ($ClO_2$), chlorine gas ($Cl_2$), bromine gas ($Br_2$), fluorine gas ($F_2$), chlorine monofluoride (ClF), oxygen gas ($O_2$), ozone ($O_3$), nitrous oxide ($N_2O$), nitric oxide (NO), and nitrogen dioxide ($NO_2$) In some implementations, the second fluid is capable of forming foams in the wellbore, reacting to generate halogens, or both.

FIG. 9 is an example process flow diagrams of processes of filter cake removal in accordance with an implementation. A process 900 starts with a step 902 of injecting a reactive treatment fluid into a wellbore in a subterranean formation including a filter cake on a wall of the wellbore, where the filter cake includes a barite, and the reactive treatment fluid includes a base fluid, a chelating agent, a carbonate, an oxidizing salt, an organic acid, a viscoelastic surfactant (VES), and a base. Subsequently, a step 904 is performed to contact the reactive treatment fluid with the filter cake in the wellbore, where the reactive treatment fluid dissolves or exfoliates the barite from the wall into the reactive treatment fluid, followed by a step 906 of recovering the reactive treatment fluid including the barite removed from the wall.

EXAMPLES

An example composition of the reactive treatment fluid in accordance with one implementation is summarized in Table 1.

TABLE 1

Chemical composition of reactive treatment fluid for filter cake removal

| Component | Concentration | Function |
| --- | --- | --- |
| DTPA | 5-30 wt. % | Chelating agent |
| Oxalic acid | 1-15 wt. % | Chelation activator |
| Erucylamidopropyl betaine (Armovis ® EHS) | 4-10 vol. % | Viscoelastic surfactant (VES) |
| Potassium carbonate | 5-30 wt. % | Sulfate converter |
| Potassium hydroxide | 0.2-5 wt. % | pH control agent |
| Sodium bromate | 1-20 | Oxidizing salt |

TABLE 1-continued

Chemical composition of reactive treatment fluid for filter cake removal

| Component | Concentration | Function |
|---|---|---|
| Water | 50-70 wt. % | Base fluid |
| Polylactic acid particles | 10 wt. % | Delayed acid |

Figure 10:
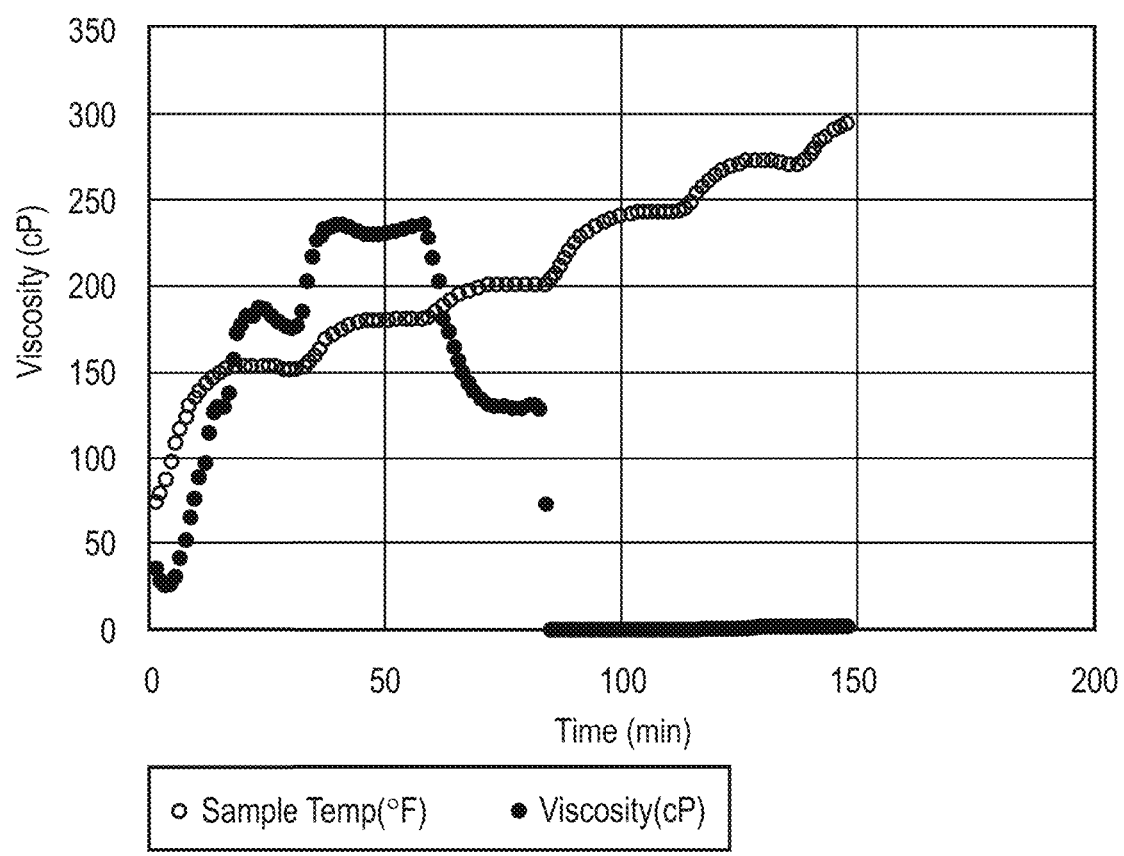
FIG. 10 is a plot of rheological profiles for a reactive treatment fluid as a function of temperature.

In accordance with an implementation, two sets of example reactive treatment fluid were prepared and their rheological characteristics were investigated. The viscosity was measured by a Grace M5600 viscometer with R1B5 bob at 100 sec$^{-1}$. The first reactive treatment fluid was prepared by mixing HalKleen™ B (32.5 mL), deionized water (DI-H$_2$O) (32.5 mL), Armovis® EHS surfactant (erucylamidopropyl betaine) (6 mL), and sodium bromate (NaBrO$_3$) (3.5 g). HalKleen™ B contains DTPA. The pH of the solution was measured to be 11.15. The temperature sweeps were done by heating to a set temperature and holding at that temperature for 30 min before increasing the temperature to a next set point. The temperature sweeps were done at 150° F. (66° C.), 180° F. (82° C.), 200° F. (93° C.), 240° F. (116° C.), 280° F. (138° C.), and 300° F. (149° C.). The measured viscosity profile at different temperatures is shown in FIG. 10. A relatively high viscosity from about 100 cP (mPa·s) to about 250 cP (mPa·s) was maintained at temperatures of 200° F. (93° C.) or lower. Increasing the temperature to 240° F. (116° C.) substantially dropped the viscosity to about 3 cP (mPa·s), representing the temperature limit for this reactive treatment fluid to effectively function. The reactive treatment fluid can be usable in the formation whose temperature does not exceed this temperature limit for fluid breakdown. In various implementations, particularly in horizontal well applications, maintaining an appropriate range of viscosity can enable diverting the reactive treatment fluid to achieve a high zonal coverage for the filter cake removal.

Figure 11:
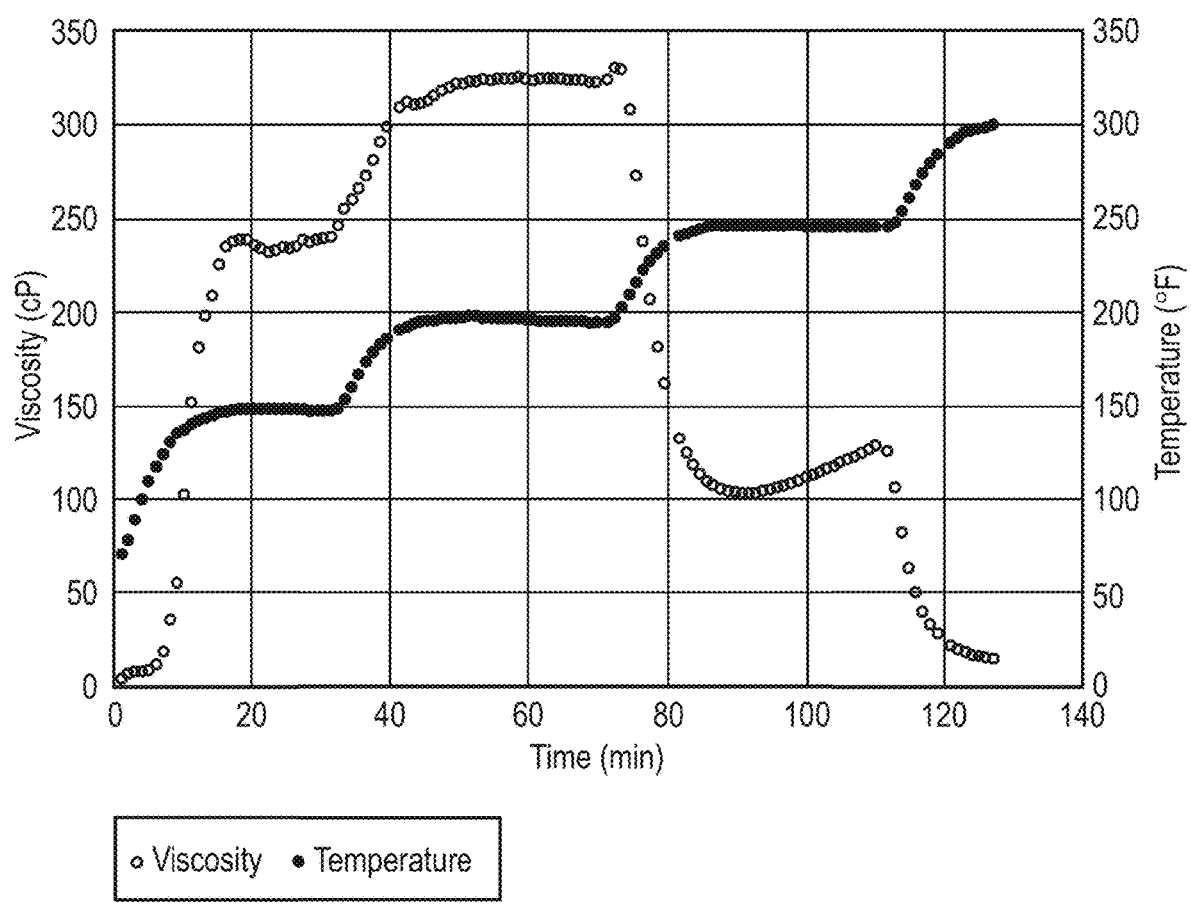
FIG. 11 is a plot of rheological profiles for a chelating agent-containing reactive treatment as a function of temperature.

The second reactive treatment fluid was prepared by mixing the sodium salt of DTPA (32 g), NaBrO$_3$ (3.5 g), DI-H$_2$O (32.5 g) and Armovis® EHS surfactant (6 ml) to prepare 75 g of the fluid. The pH of the solution was adjusted to 9.18 by adding 50% KOH aqueous solution. The temperature sweeps were done by heating to a set temperature and holding at that temperature for 30 min before increasing the temperature to a next set point. The temperature sweeps were done at 150° F. (66° C.), 200° F. (93° C.), 250° F. (121° C.), and 300° F. (149° C.). The measured viscosity profile at different temperatures is shown in FIG. 11. A relatively high viscosity from about 100 cP (mPa·s) to about 250 cP (mPa·s) was maintained at temperatures of 200° F. (93° C.) or lower. Increasing the temperature to 240° F. (116° C.) substantially dropped the viscosity to about 3 cP (mPa·s). Compared to the first reactive treatment fluid, a higher viscosity from about 250 cP (mPa·s) to about 350 cP (mPa·s) was maintained at temperatures of 200° F. (93° C.) or lower. Increasing the temperature to 250° F. (116° C.) led to the decreased viscosity, but it became stable between 100 cP (mPa·s) and 150 cP (mPa·s). This result demonstrates the improved rheological characteristic of the reactive treatment fluid at high temperatures, e.g., 250° F. (121° C.). Further increasing the temperature to 300° F. (149° C.) resulted in the viscosity drop to about 20 cP (mPa·s) or lower.

Further, barite dissolution tests were also conducted using an example reactive treatment fluid. The reactive treatment fluid was by mixing DTPA (27 g), KOH (18 g), DI-H$_2$O (143 g), potassium carbonate (12 g), NaBrO$_3$ (7.0 g), and Armovis® EHS (12 ml) to prepare 200 g of the fluid. The pH of the solution was adjusted to 10.2 by adding 25% KOH aqueous solution. The dissolution tests were conducted by mixing the reactive treatment fluid (20 mL) and barite power (2 g) in a 200 mL test tube. The test tube was capped and heated in an oil bath at 250° F. (121° C.) for 24 h. After the heating, the solution was filtered through a filter paper to collect solid materials. The recovered solid was washed with methanol, dried, and weighed to determine the mass of the undissolved barite. The result shows that 25 wt. % of the barite was dissolved by the reactive treatment fluid, demonstrating the promise for the application in filter cake removal processes.

Further, additional experiments were conducted to examine the effect of the cation of the sulfate converter. Two reactive treatment fluids were prepared to have the same compositions except the sulfate converter. For both fluids, DTPA, KOH, and barite were added to water as summarized in Table 2. For the sulfate converter, potassium carbonate (K$_2$CO$_3$) or cesium carbonate (Cs$_2$CO$_3$) was further added to the fluid. The homogenous mixture was prepared by mixing the above ingredients. The prepared fluid was then placed in a 100 mL Parr reactor, 2.50 g of BaSO$_4$ was added, and the reactor was sealed. The mixture was heated to 121° C. with stirring at 150 rpm for 72 hours. After the reaction, the reactor was cooled to room temperature and opened for sample collection. The fluid was centrifuged then the supernatant was analyzed with inductively coupled plasma mass spectrometry (ICP-MS) to determine the concentration of barium ions in solution. The Ba ion concentration was then used to calculate the amount of the dissolved barite for each sample. The results of this dissolution test were also summarized in Table 2. As shown below, both fluids were able to dissolve more than 50% of the added barite. Further, the results demonstrate the effect of the cation in the sulfate converter. In particular, the fluid with cesium carbonate was shown to be more effective in dissolving barite compared to that with potassium carbonate, suggesting that the sulfate converter is not limited to potassium species but can use other alkali metal ions as well. In fact, the results show the potential advantage of such other alkali metal ions other than potassium over the potassium counterpart.

TABLE 2

Chemical composition of reactive treatment fluid and the barium dissolution test results

| Component | Sample 1 (K cation) | Sample 2 (Cs cation) |
|---|---|---|
| DTPA | 6.75 g | 6.75 g |
| Potassium hydroxide | 4.5 g | 4.5 g |
| Water | 35.75 g | 28.25 g |
| Potassium carbonate | 3 | 0 |
| Cesium carbonate | 0 | 10.5 |
| Barite | 2.5 g | 2.5 g |
| Fluid after dissolution test | | |
| Remaining effluent | 39 mL | 33.25 mL |
| Ba concentration | 20570 ppm | 34140 ppm |
| Dissolved barite | 54% | 77% |

Definitions

The term "about" as used in this disclosure can allow for a degree of variability in a value or range, for example, within 10%, within 5%, or within 1% of a stated value or of a stated limit of a range.

As used in this disclosure, "weight percent" (wt %) can be considered a mass fraction or a mass ratio of a substance to the total mixture or composition. Weight percent can be a weight-to-weight ratio or mass-to-mass ratio, unless indicated otherwise.

A number of embodiments of the disclosure have been described. Nevertheless, it will be understood that various modifications may be made without departing from the spirit and scope of the disclosure.

Embodiments

1. A reactive treatment fluid for filter cake removal, the reactive treatment fluid including: a base fluid; a chelating agent; a carbonate; an oxidizing salt; an organic acid; a viscoelastic surfactant (VES); and a base.

2. The reactive treatment fluid of embodiment 1, where the base fluid is water.

3. The reactive treatment fluid of embodiment 1 or 2, where the chelating agent includes an aminopolycarboxylic acid or a salt thereof.

4. The reactive treatment fluid of any one of embodiments 1-3, where the chelating agent includes diethylenetriamine pentaacetic acid (DTPA), hydroxyethyl ethylenediaminetriacetic acid (HEDTA), ethylenediaminetetraacetic acid (EDTA), nitrilotriacetic acid (NTA), ethyleneglycol-O,O'-bis(2-aminoethyl)-N,N,N',N'-tetraacetic acid (EGTA), hydroxyethyl iminodiacetic acid (HIDA), glutamic acid N,N-diacetic acid (GLDA), or a salt thereof.

5. The reactive treatment fluid of any one of embodiments 1-4, where the carbonate is potassium carbonate or cesium carbonate.

6. The reactive treatment fluid of any one of embodiments 1-5, where the oxidizing salt includes a chlorate or bromate.

7. The reactive treatment fluid of any one of embodiments 1-6, where the organic acid includes oxalic acid, formic acid, acetic acid, or lactic acid.

8. The reactive treatment fluid of any one of embodiments 1-7, where the VES includes erucylamidopropyl betaine.

9. The reactive treatment fluid of any one of embodiments 1-8, where the base includes potassium hydroxide.

10. The reactive treatment fluid of any one of embodiments 1-9, where: the base fluid is from about 50 weight percent (wt. %) to about 70 wt. % of the reactive treatment fluid; the chelating agent is from about 1 wt. % to about 15 wt. % of the reactive treatment fluid; the carbonate is from about 5 wt. % to about 30 wt. % of the reactive treatment fluid; the oxidizing salt is from about 1 wt. % to about 20 wt. % of the reactive treatment fluid; the organic acid is from about 1 wt. % to about 15 wt. % of the reactive treatment fluid; and the base is from about 0.2 wt. % to about 5 wt. % of the reactive treatment fluid.

11. The reactive treatment fluid of any one of embodiments 1-10, further including an acid-generating material.

12. The reactive treatment fluid of embodiment 11, where the acid-generating material includes polylactic acid (PLA), polyglycolic acid (PGA), an orthoester, or a polyanhydride.

13. A reactive treatment fluid for filter cake removal, the reactive treatment fluid including: water; diethylenetriamine pentaacetic acid (DTPA); a carbonate; an oxidizing salt; oxalic acid; a viscoelastic surfactant (VES); and a base.

14. The reactive treatment fluid of embodiment 13, where a pH of the reactive treatment fluid is from about 9 to about 12.

15. The reactive treatment fluid of embodiment 13 or 14, where: the water is from about 50 weight percent (wt. %) to about 70 wt. % of the reactive treatment fluid; the DTPA is from about 1 wt. % to about 15 wt. % of the reactive treatment fluid; the carbonate is from 5 wt. % to 30 wt. % of the reactive treatment fluid; the oxidizing salt from about 1 wt. % to about 20 wt. % of the reactive treatment fluid; the oxalic acid is from about 1 wt. % to about 15 wt. % of the reactive treatment fluid; and the base is from about 0.2 wt. % to about 5 wt. % of the reactive treatment fluid.

16. A method of treating a wellbore for filter cake removal, the method including: injecting a reactive treatment fluid into a wellbore in a subterranean formation including a filter cake on a wall of the wellbore, the filter cake including a barite, the reactive treatment fluid including: a base fluid, a chelating agent, a carbonate, an oxidizing salt, an organic acid, a viscoelastic surfactant (VES), and a base; contacting the reactive treatment fluid with the filter cake in the wellbore, the reactive treatment fluid dissolving or exfoliating the barite from the wall into the reactive treatment fluid; and recovering the reactive treatment fluid including the barite removed from the wall.

17. The method of embodiment 16, further including, prior to injecting the reactive treatment fluid into the wellbore, forming the wellbore by drilling, where the drilling forms the filter cake in the wellbore.

18. The method of embodiment 17, where the drilling includes drilling using an oil-based drilling fluid (OBDF) including an oil, a polymer, and the barite.

19. The method of any one of embodiments 16-18, further including providing carbon dioxide ($CO_2$) into the wellbore.

20. The method of any one of embodiments 16-18, further including foaming the reactive treatment fluid with $CO_2$.

What is claimed is:

1. A reactive treatment fluid for filter cake removal, the reactive treatment fluid comprising:
   a base fluid that is from about 50 weight percent (wt. %) to about 70 wt. % of the reactive treatment fluid;
   a chelating agent that is from about 1 wt. % to about 15 wt. % of the reactive treatment fluid;
   a carbonate that is from about 5 wt. % to about 30 wt. % of the reactive treatment fluid;
   an oxidizing salt that is from about 1 wt. % to about 20 wt. % of the reactive treatment fluid;
   an organic acid that is from about 1 wt. % to about 15 wt. % of the reactive treatment fluid;
   a viscoelastic surfactant (VES); and
   a base that is from about 0.2 wt. % to about 5 wt. % of the reactive treatment fluid.

2. The reactive treatment fluid of claim 1, wherein the base fluid is water.

3. The reactive treatment fluid of claim 1, wherein the chelating agent comprises an aminopolycarboxylic acid or a salt thereof.

4. The reactive treatment fluid of claim 1, wherein the chelating agent comprises diethylenetriamine pentaacetic acid (DTPA), hydroxyethyl ethylenediaminetriacetic acid (HEDTA), ethylenediaminetetraacetic acid (EDTA), nitrilotriacetic acid (NTA), ethyleneglycol-O,O'-bis(2-aminoethyl)-N,N,N',N'-tetraacetic acid (EGTA), hydroxyethyl iminodiacetic acid (HIDA), glutamic acid N,N-diacetic acid (GLDA), or a salt thereof.

5. The reactive treatment fluid of claim 1, wherein the carbonate is potassium carbonate or cesium carbonate.

6. The reactive treatment fluid of claim 1, wherein the oxidizing salt comprises a chlorate or bromate.

7. The reactive treatment fluid of claim 1, wherein the organic acid comprises oxalic acid, formic acid, acetic acid, or lactic acid.

8. The reactive treatment fluid of claim 1, wherein the VES comprises erucylamidopropyl betaine.

9. The reactive treatment fluid of claim 1, wherein the base comprises potassium hydroxide.

10. The reactive treatment fluid of claim 1, further comprising an acid-generating material.

11. The reactive treatment fluid of claim 10, wherein the acid-generating material comprises polylactic acid (PLA), polyglycolic acid (PGA), an orthoester, or a polyanhydride.

12. A reactive treatment fluid for filter cake removal, the reactive treatment fluid comprising:
water that is from about 50 weight percent (wt. %) to about 70 wt. % of the reactive treatment fluid;
diethylenetriamine pentaacetic acid (DTPA) that is from about 1 wt. % to about 15 wt. % of the reactive treatment fluid;
a carbonate that is from 5 wt. % to 30 wt. % of the reactive treatment fluid;
an oxidizing salt that is from about 1 wt. % to about 20 wt. % of the reactive treatment fluid;
oxalic acid that is from about 1 wt. % to about 15 wt. % of the reactive treatment fluid;
a viscoelastic surfactant (VES); and
a base that is from about 0.2 wt. % to about 5 wt. % of the reactive treatment fluid.

13. The reactive treatment fluid of claim 12, wherein a pH of the reactive treatment fluid is from about 9 to about 12.

14. A method of treating a wellbore for filter cake removal, the method comprising:
injecting a reactive treatment fluid into a wellbore in a subterranean formation comprising a filter cake on a wall of the wellbore, the filter cake comprising a barite, the reactive treatment fluid comprising:
a base fluid that is from about 50 weight percent (wt. %) to about 70 wt. % of the reactive treatment fluid,
a chelating agent that is from about 1 wt. % to about 15 wt. % of the reactive treatment fluid,
a carbonate that is from about 5 wt. % to about 30 wt. % of the reactive treatment fluid,
an oxidizing salt that is from about 1 wt. % to about 20 wt. % of the reactive treatment fluid,
an organic acid that is from about 1 wt. % to about 15 wt. % of the reactive treatment fluid,
a viscoelastic surfactant (VES), and
a base that is from about 0.2 wt. % to about 5 wt. % of the reactive treatment fluid;
contacting the reactive treatment fluid with the filter cake in the wellbore, the reactive treatment fluid dissolving or exfoliating the barite from the wall into the reactive treatment fluid; and
recovering the reactive treatment fluid comprising the barite removed from the wall.

15. The method of claim 14, further comprising, prior to injecting the reactive treatment fluid into the wellbore, forming the wellbore by drilling, wherein the drilling forms the filter cake in the wellbore.

16. The method of claim 15, wherein the drilling comprises drilling using an oil-based drilling fluid (OBDF) comprising an oil, a polymer, and the barite.

17. The method of claim 14, further comprising providing carbon dioxide ($CO_2$) into the wellbore.

18. The method of claim 14, further comprising foaming the reactive treatment fluid with $CO_2$.

* * * * *